United States Patent [19]
Burns et al.

[11] 3,926,462
[45] Dec. 16, 1975

[54] SHOCK ABSORBING BUFFER ASSEMBLY

[75] Inventors: Ronald N. Burns, Utica, Mich.;
Dewayne A. Landwehr, Anderson, Ind.; Roger H. Schroeder, Rochester; Robert A. Vogelei, Lathrup Village, both of Mich.; Gary P. Zeller, Anderson, Ind.

[73] Assignee: General Motors Corporation, Detroit, Mich.

[22] Filed: Oct. 11, 1974

[21] Appl. No.: 514,079

[52] U.S. Cl. ............... 293/63; 293/1; 293/69 R; 293/70; 293/71 R; 293/72; 293/101; 296/28 R; 296/31 P
[51] Int. Cl.² ............... B60R 19/08; B60R 21/14; B61F 19/04; B62D 29/04
[58] Field of Search ........... 293/1, 60, 6 Z, 63, 69 R, 293/70, 71 R, 71 P, 72, 85, 88, 101; 296/28 R, 28 E, 31 R, 31 P

[56] References Cited
UNITED STATES PATENTS

| | | | |
|---|---|---|---|
| 1,754,112 | 4/1930 | Lusse | 293/71 R X |
| 2,062,327 | 12/1936 | Morrison | 293/63 |
| 2,788,998 | 4/1957 | Wilfert | 293/62 |
| 2,829,915 | 4/1958 | Claveou | 293/63 X |
| 2,965,403 | 12/1960 | Barenyi et al. | 296/28 R X |
| 3,068,039 | 12/1962 | Barenyi | 296/28 R |
| 3,493,257 | 2/1970 | Fitzgerald et al. | 293/71 R |
| 3,744,835 | 7/1973 | Carbone et al. | 293/1 |
| 3,836,192 | 9/1974 | Wilfert | 296/31 P X |
| 3,850,474 | 11/1974 | Welch | 296/31 P |
| 3,876,243 | 4/1975 | Bell et al. | 293/71 P |
| 3,901,543 | 8/1975 | Norlin | 293/71 R |

FOREIGN PATENTS OR APPLICATIONS

| | | | |
|---|---|---|---|
| 346,267 | 7/1972 | Sweden | 293/71 R |
| 1,923,305 | 10/1970 | Germany | 293/71 R |

*Primary Examiner*—M. Henson Wood, Jr.
*Assistant Examiner*—Howard Beltran
*Attorney, Agent, or Firm*—Charles R. White

[57] ABSTRACT

This buffer assembly forms a shock absorbing system that has a rigid horizontally-extending channeled support beam disposed in the vehicle body which is coupled to the vehicle frame. An elongated one-piece plastic grid of longitudinally extending cells provides a resilient primary energy-absorbing medium which is seated in the support beam and which extends forwardly to an exterior location with respect to the vehicle body for absorbing impact forces. A central portion of the plastic grid provides a yieldable backing for a centralized rubber-covered metal plate that distributes localized impact forces to a large number of cells of the grid to reduce impact penetration. A thin walled flexible plastic facia, fitted over the spreader plate and over horizontally extending wing portions of the cellular grid, is peripherally fastened to the vehicle body to provide a streamlined appearance and to simulate vehicle body work.

3 Claims, 5 Drawing Figures

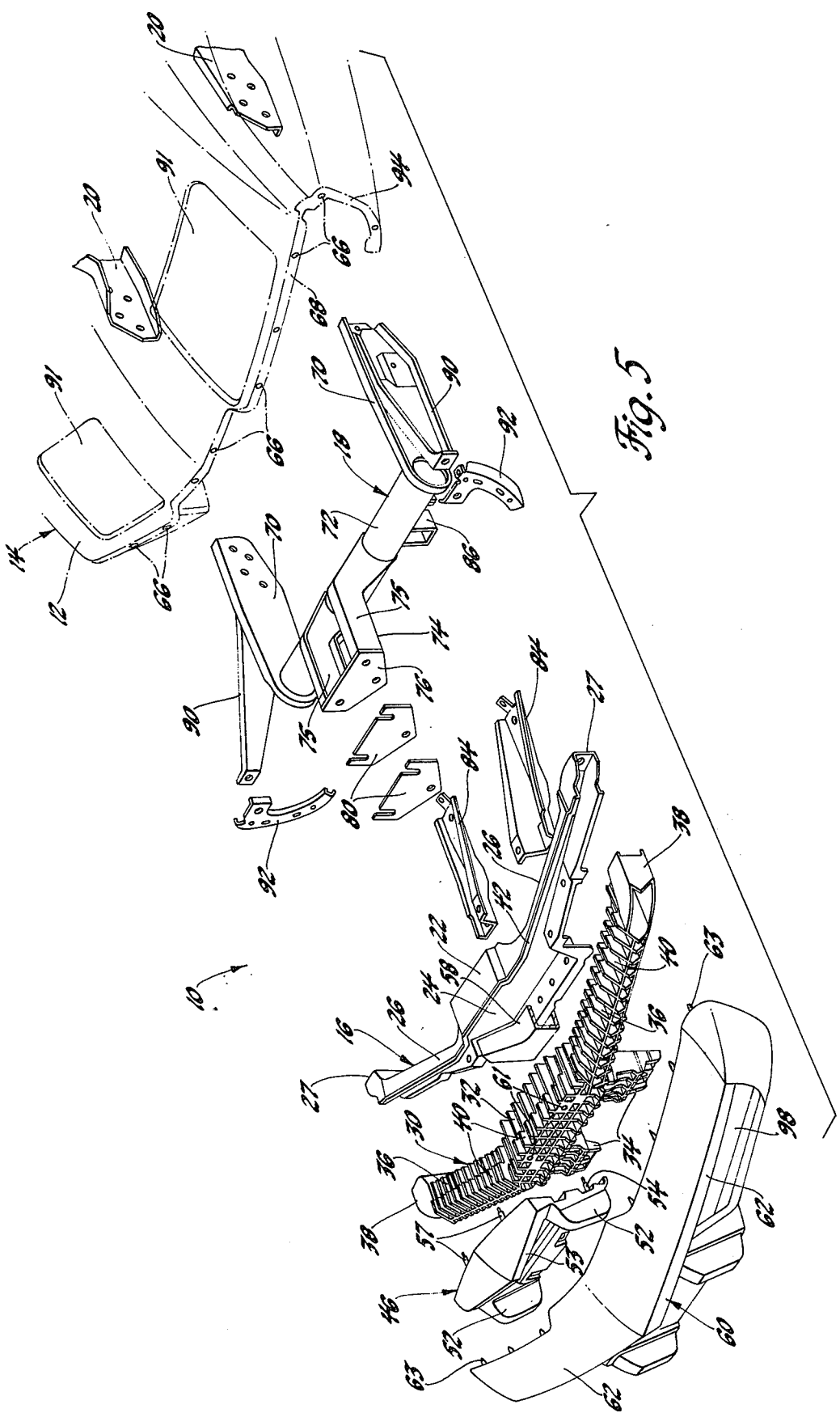

SHOCK ABSORBING BUFFER ASSEMBLY

This invention relates to energy absorbing devices and more particularly to a new and improved self-restoring impact energy absorbing system for vehicles featuring an elastic energy absorbing cellular grid operatively sandwiched between a stationary support beam internal of a vehicle body and a force-spreading plate device external of the vehicle body.

Prior to the present invention, there have been many energy management systems used to absorb impact energy resulting from a vehicle striking an object or being struck by other vehicles and objects. One widely used system incorporates a pair of energy absorbing cylinders which support conventional rigid bumper structure and which control the rate of travel of the bumper inwardly in response to impact to dissipate impact energy. In another system there is a resilient energy absorbing media backed by a projecting heavy duty rigid support bar which cushions and dissipates energy of impact. Another prior art system employs a plurality of identical plastic energy absorbing cellular blocks mounted end to end laterally on an exterior bumper to provide for absorption of impact energy. While these prior systems are satisfactory and successfully manage impact energy, they are often bulky in appearance and have added substantially to the vehicle length, weight and costs.

This invention provides a new and improved energy absorbing system which eliminates the heavy external bumpers of the prior art constructions so that overall vehicle length is not increased and so that the increase in vehicle weight is minimized. This invention has a special cellular grid which can be readily shaped for styling purposes and to provide a yieldable self-restoring backing for a flexible plastic facia covering and protecting the interior components of the system. This facia provides a smooth and pleasing appearance which preferably is painted the color of the body to simulate vehicle body work. With this invention effective energy absorption with minimized damage to the vehicle or to the components of the energy absorbing assembly is provided and at the same time a reduction in cost over previously utilized self-restoring energy-absorbing units can be achieved.

More specifically this invention features a horizontally extending support beam rigidly mounted to the vehicle frame internally within the vehicle body and ahead of the engine. The support beam is preferably a channeled steel member in which there is seated a horizontally-extending one-piece plastic grid of longitudinally extending cells, each generally rectilinear in cross section, that forms the primary energy absorbing medium of this invention. The cellular grid supported interiorly of the vehicle body has a front horizontal portion spaced forwardly from the vehicle body so that objects deflecting the grid will not contact and cause damage to the vehicle body work. The projecting forward portions of the cellular grid are shaped to enhance vehicle body styling and provide for the production of an effective energy absorber which does not resemble conventional bumper structures. The arrangement, size and draft of the cells of the grid are selected to assure good impact absorption and recovery characteristics under repeated low speed collisions. The grid has a central portion comprising a box of cells and left and right wings, each comprising a row of cells, swept back from the central portion. The cells of the central portion of the grid extend longitudinally and form a primary portion to absorb the energy of a 5 mph straight-ahead impact. Such impact forces are distributed to the cells by a spreader plate assembly having a steel backing plate fitted up against the front end of the central portion of the grid. To further provide for improved energy absorption and to protect the vehicle body, the spreader plate assembly has molded thereon a pair of elastomeric vertically-extending guards which are connected by a forwardly-projecting top cross bar. These resilient elastomeric parts of the spreader plate provide improved protection from minor impacts in which there is little or no deflection of the cellular grid. The forward portions of the cellular grid and the spreader plate are covered with a thin walled plastic facia which fits over the exterior of the components to provide a smooth and streamlined exterior surface which matches and simulates vehicle body work. This facia is preferably peripherally attached to the vehicle body and provides continuous uninterrupted body lines. In this invention there is provided the improved support structure for the laterally extending support beam that provides space for and protects the vehicle headlamps in their stored position. The cellular grid is an elastic body which gradually recovers to its original shape when the impact load is removed so that the components of this system are returned to their original position.

These and other features, objects and advantages of this invention will be more apparent to those skilled in the art from the following detailed description and drawings, in which:

FIG. 5 is an exploded perspective view showing the components of the energy absorbing system of this invention and its connection with the vehicle body frame.

Figure 1:
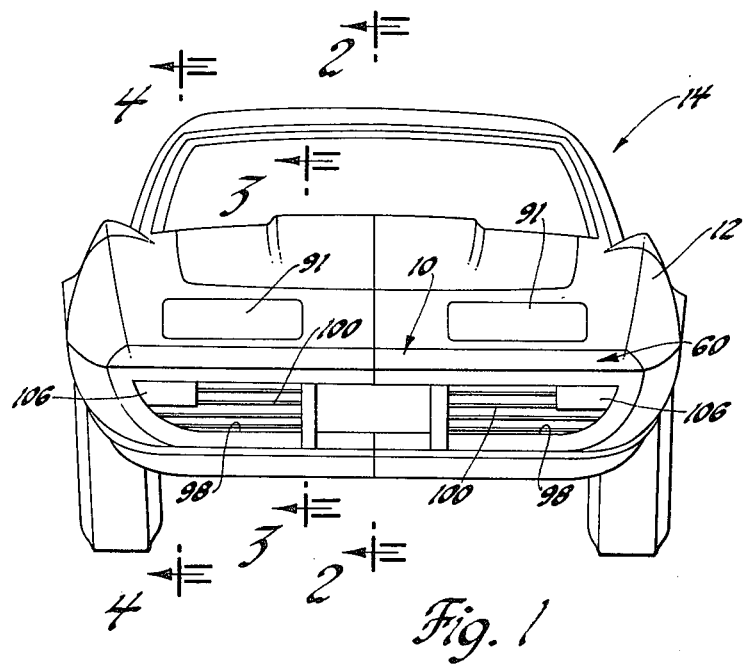
FIG. 1 is a front elevational view of a vehicle incorporating this invention.

Referring in detail to the drawings, there is shown an energy absorbing assembly 10 that extends horizontally across the front of the body 12 of a vehicle 14 and longitudinally from a recessed location within the body to a forward location from the body to provide impact protection for the entire front end of the vehicle. The energy absorbing assembly includes a steel support beam 16 that is secured in a recessed location in the body by support structure 18 that is in turn secured to the side rails 20 of the vehicle frame. The support beam 16 has an enlarged box-like central portion 22 providing a center pocket 24 and a pair of laterally extending channeled wing portions 26 that gradually sweep rearwardly from either side of the central portion to terminal end portions 27. The support beam being opened in its entirety at its front or forward end provides a seat for a thermoplastic energy absorber 30 which is fitted therein.

Figure 2:
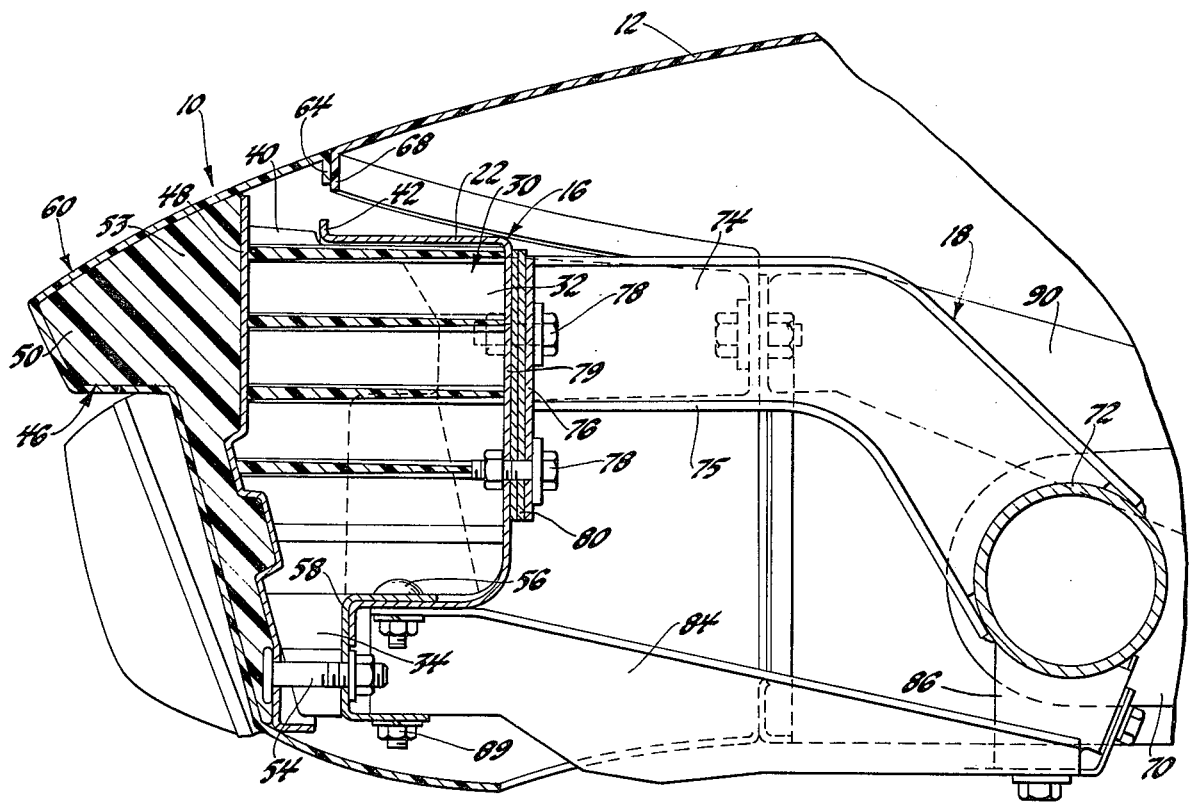
FIG. 2 is a sectional view taken generally along lines 2—2 of FIG. 1.
Figure 3:
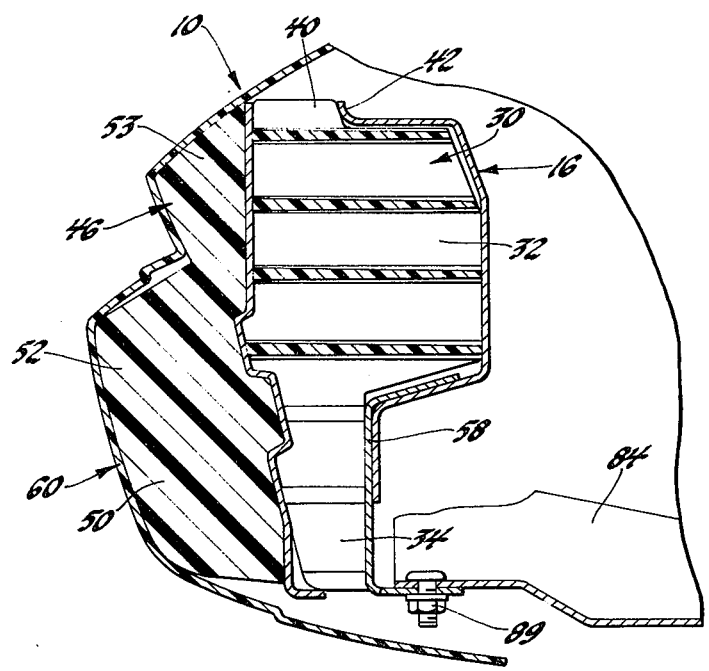
FIG. 3 is a sectional view taken along lines 3—3 of FIG. 1.
Figure 4:
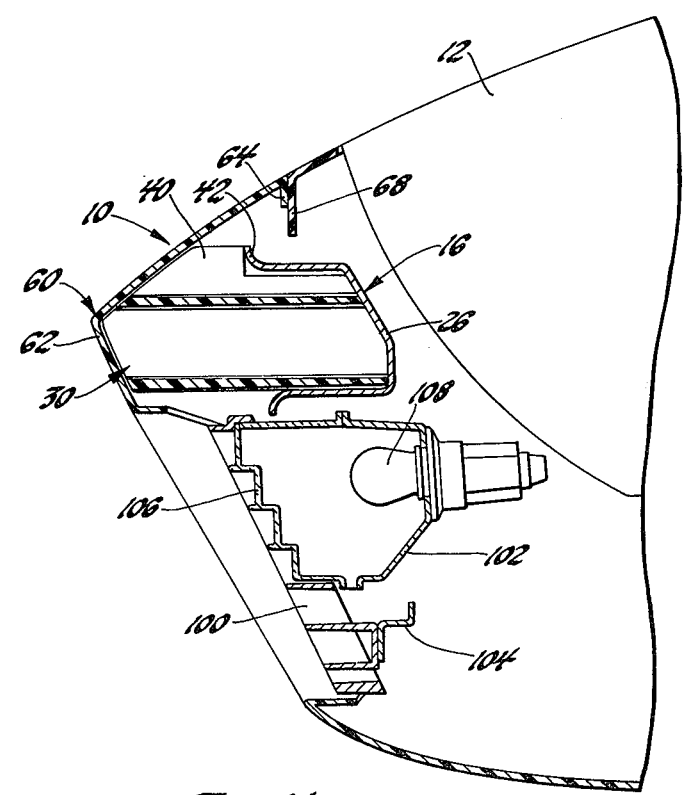
FIG. 4 is a view taken generally along lines 4—4 of FIG. 1.

The energy absorber 30 is preferably injection molded from an olefin copolymer plastic material or blended olefin material into a one-piece grid of rectilinear, longitudinally-extending cells, the majority of which are open at both ends. This cellular energy absorber has a large, generally rectangular, central portion 32 with spaced downwardly extending legs 34, the central portion 30 and legs 34 fitting in the central pocket 24 of the support beam. The cells of the central portion of the energy absorbing grid are parallel with each other and are parallel to the longitudinal axis of the vehicle. As best shown in FIG. 5 the energy absorbing grid further has left and right wings 36 which sweep rearwardly at a low angle from the central portion to enlarged terminal end cells 38. The wings 36 of the energy absorber fit in the channel of the wing portions of the support beam 16. Each wing 36 of the energy absorbing grid has only a single row of cells as best shown in FIGS. 4 and 5 while the central portion has a plurality of rows of such cells. Both the central portion and the wings of the energy absorbing grid are formed with a plurality of vertically extending webs 40 which abut against a vertical flange portion 42 of the beam 16 as best shown in FIGS. 2, 3 and 4 for improved backing support of the grid. Since the grid extends forwardly from a recessed position to a location forwardly of the vehicle body the longitudinal dimension of the grid provides for improved absorption of impact energy without adversely affecting vehicle body lines.

The front of the central portion 32 of the cellular energy absorber 30 provides a resilient backing surface for an impact force spreader plate assembly 46. This spreader plate assembly comprises a stamped steel backing plate 48 and a thick elastomeric bumper member 50 compression molded thereon. The elastomeric bumper member 50 is a resilient member and is formed with a pair of spaced, vertically-extending protrusions 52 which project forwardly and function as bumper guards. Additionally the bumper member 50 has an upper horizontal bar 53 interconnecting protrusions 52 that extend forwardly to withstand localized low speed impacts. The spreader plate assembly is seated on the front of the central portion 32 of the energy absorber 30 and is fastened to the support beam by suitable securing means such as bolt means 54 and 56 and front bracket means 58. Bolts such as bolt means 54 extend through suitable openings formed in end walls in certain cells of grid 30 to secure the grid to support beam 16. Bolt means 57 extend from the spreader plate assembly through openings in the front end walls on the outer ends of cells 61 and through the support beam 16 and receive retainer nuts to secure the spreader plate assembly to energy absorber 30 and the support beam.

To provide a finished streamlined appearance for the vehicle and to protect the energy absorber 32 and other inner components of the energy absorbing assembly, a shell-like flexible facia 60 is provided. Preferably facia 60 is injection molded into a one-piece unit from a suitable elastomeric material, such as thermoplastic urethane. This facia has left and right limb portions 62 which sweep rearwardly from a front centerline to closely fit over the outer configuration of a spreader plate assembly and the wings 36 of the energy absorber. The facia is formed with an inwardly extending flange 64 around a portion of the perimeter thereof which supports mounting pads not shown having projecting fasteners 63 that fit into openings 66 formed in a front flange of the body 12 to provide for the attachment of the facia to the vehicle body.

The support structure 18 for the energy absorbing assembly of this invention comprises a pair of forwardly extending arms 70 each of which is bolted at an inner end to a corresponding side rail 20 of the vehicle frame. The front ends of arms 70 support a horizontally extending center bar 72. Mounted on this center bar and projecting forwardly therefrom is a centralized mounting bracket 74 having a pair of forwardly extending arms 75 to which is secured a flat mounting plate 76. Bolt means 78, shown in FIG. 2, extend through this mounting plate and an end wall 79 of the support beam to fasten the support beam to the mounting plate. Shim plates 80 are employed between mounting plates 76 and the end wall of the support beam 16.

The support beam 16 is further connected to the center bar 72 by a first pair of reinforcing arms 84 which are bolted at one end to brackets 86 extending downwardly from the center bar 72. The forward ends of these arms are secured to bracket 58 by bolt means 89. Also bolt means 56 secures the flanged upper end of these reinforcing arms to the bottom of the support beam and to brackets 58 as best shown in FIG. 2. The support structure 18 further comprises a second pair of reinforcing arms 90 which are bolted at their inner ends to the extension arms 70 and extend forwardly at predetermined angles therefrom. The forward end of each reinforcing arm 90 is connected to a corresponding terminal end 27 of support beam 16. The vehicle 14 has headlamp assemblies 91 which are automatically concealed when not in use. The protected spaces encompassed by support beam 16, reinforcing arms 90, center bar 72 and support bracket 74 nest each headlamp assembly 91 in its closed position. Curved front brackets 92 secured to the front of each reinforcing arm 90 fit on the front end portions 94 of the vehicle body 12. These brackets which provide additional support of the facia 60 have suitable openings to receive the fasteners 63 projecting from the corresponding peripheral wall of the facia.

The facia 60 is formed with left and right openings 98 for left and right grills 100 and left and right parking lamp assemblies 102 secured in recesses in the grills. As shown in FIG. 4 each grill is disposed below the corresponding wing 36 of the energy absorber 30 and is secured to bracket 58 by connecting bracket 104. Each parking lamp assembly comprises a housing with a transparent front lens 106 for diffusing the light from bulb 108 when the bulb is energized.

The energy absorbing system of this invention is a self-restoring system for effectively absorbing energy from straight-ahead and angular impacts. The rubber covered steel spreader plate and the cellular cushion or grid backing the spreader plate are primary components in the operation of the system of this invention. In a predetermined low speed pendulum impact at the center line the spreader plate will be displaced rearwardly to deflect the grid toward the back of the support beam 16. The impacted portion of the flexible facia is forced inwardly along with the plate. After such impact, the deflected cushion gradually recovers to return the spreader plate and the facia to their original positions.

Low speed impact directed to either wing of the cellular grid causes the facia and the affected cells of the wing to deflect. The cell deflection absorbs impact energy to prevent damage to the vehicle body and other vehicle components. After the impact force is removed the deflected cells recover to their original shape and return the facia to its original position. The terminal cells 38 of each wing 36 are substantially larger than the other cells of the grid and have a different geometric configuration to tailor the energy management characteristics of the grid for improved absorptions of corner impacts.

Although this invention is specifically described as a system for the front of a vehicle it can be readily employed as a rear energy absorbing system. Also the support beam for the energy absorbing grid could be of any suitable shape and be connected to other vehicle body constructions.

While a preferred embodiment of this invention has been shown and described to illustrate the invention, other embodiments and modifications will now be apparent to those skilled in the art. Accordingly, this invention is not limited by the description of the preferred embodiment, but only by the following claims:

We claim:

1. An energy absorbing system to provide impact protection for a vehicle comprising a vehicle body, an elongated support beam extending substantially across the width of said body and secured within the walls of said body, said support beam having a laterally extending channel therein, a plastic one-piece energy absorbing unit coextensive with said beam and seated in said channel and extending longitudinally from said support beam to a position outside of said body, a rigid impact force spreader plate mounted on said energy absorbing unit and in front of a predetermined portion thereof, a flexible plastic facia covering said spreader plate and said energy absorbing unit, means attaching the periphery of said facia directly to a front portion of said body, said energy absorbing unit comprising a grid of longitudinally extending cells which respond to an impact force imparted to said energy absorber system moving said spreader plate by deflecting to absorb the energy of impact, and said grid when deflected up to a predetermined limit possessing a force of recovery to move said spreader plate and said flexible facia to a free state position in response to removal of the impact force.

2. An energy absorbing system to provide impact protection for a vehicle comprising a vehicle body, a vehicle frame supporting said body, an elongated support beam extending substantially across the width of said body and disposed within the walls of said body, said support beam having a laterally extending channel therein, a plastic one-piece energy absorbing unit extending substantially across the width of said body and seated in said channel and extending longitudinally from said channel to a position outside of said body, said energy absorbing unit having an enlarged center portion and left and right wing portions extending from said center portion, a rigid impact force spreader plate mounted directly on said energy absorbing unit in front of said center portion, a flexible plastic facia covering said spreader plate and said energy absorbing unit, means attaching the periphery of said facia directly to a front portion of said body, said energy absorbing unit comprising a grid of longitudinally extending cells, said center portion having a plurality of rows of cells which respond to an impact force imparted to said energy absorber system which displaces said spreader plate by deflecting to absorb the energy of impact, and said grid when deflected up to a predetermined limit possessing a force of recovery to move said spreader plate and said flexible facia to a free state position in response to removal of the impact force.

3. An energy absorbing system for a vehicle to absorb the energy of impact and protect the entire width of one end of a vehicle comprising a vehicle body, a vehicle frame supporting said body having a pair of side rails, a support beam, means securing said support beam to said side rails and to mount said support beam laterally in a recessed position in said body, said support beam having a laterally extending channel therein, a plastic one-piece grid of longitudinally extending cells, said grid having an enlarged center portion and left and right wing portions seated in said channel and extending substantially across said support beam, said plastic grid extending longitudinally from said channel to a position outside of said body, a steel impact spreader plate mounted on said grid and in front of said central portion of said grid, an elastomeric bumper mounted on said spreader plate and projecting forwardly therefrom, a plastic flexible facia covering said elastomeric bumper and said spreader plate and said grid, means attaching said facia to said front portion of said body of said vehicle to provide an energy absorbing system which absorbs the energy of impact directed to said elastomer bumper and said spreader plate which displaces said spreader plate towards said support beam to effect deflection of said grid so that said grid absorbs energy of impact and subsequently moves said spreader plate and said facia to their extended free state position.

* * * * *